United States Patent [19]

Hou

[11] Patent Number: 4,611,349
[45] Date of Patent: Sep. 9, 1986

[54] HALFTONE IMAGE SCALING

[75] Inventor: Hsieh S. Hou, Rancho Palos Verdes, Calif.

[73] Assignee: Xerox Corporation, Stamford, Conn.

[21] Appl. No.: 640,200

[22] Filed: Aug. 13, 1984

[51] Int. Cl.$^4$ .............................................. G06K 9/36
[52] U.S. Cl. ...................................................... 382/47
[58] Field of Search ................... 382/47, 22; 358/263, 358/283; 340/731

[56] References Cited

U.S. PATENT DOCUMENTS 3,604,846  9/1971  Behane et al. ................... 358/263
4,381,547  4/1983  Ejiri ................................. 382/47

OTHER PUBLICATIONS

M. W. Smith et al., "A New Algorithm for Edge Detection", *Computer Graphics and Image Processing*, vol. 4, No. 1, pp. 55-62, Mar. 1975.

Primary Examiner—Stephen A. Kreitman
Attorney, Agent, or Firm—Robert E. Cunha

[57] ABSTRACT

A method of enlarging or reducing the size of a halftone one bit per pixel raster image without changing the screen pitch is disclosed. First, there is a determination of whether the current byte is on an image edge using any edge detection means. If the current byte is on an edge, the nearest neighbor algorithm is applied to the original image on a bit by bit basis to prevent edge jaggedness. If the current byte is not on an edge, the nearest neighbor algorithm is applied on a byte by byte basis to prevent Moire patterns in the solid areas of the image.

12 Claims, 4 Drawing Figures

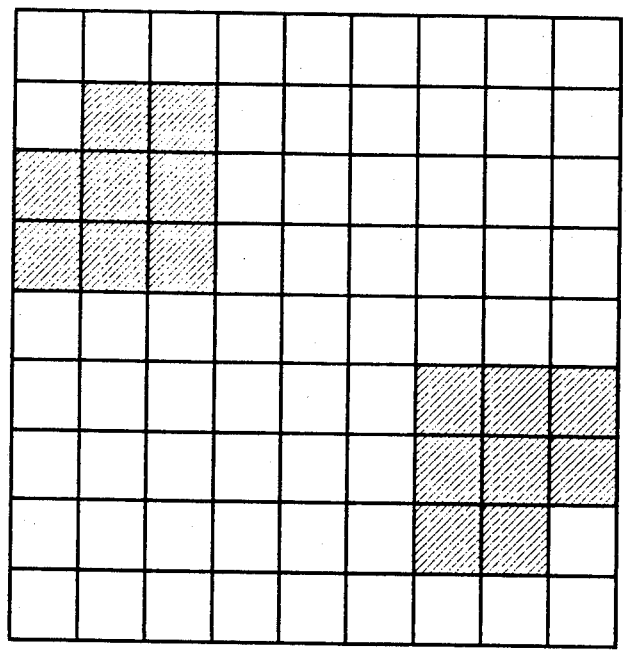
PRIOR ART  FIG. 1
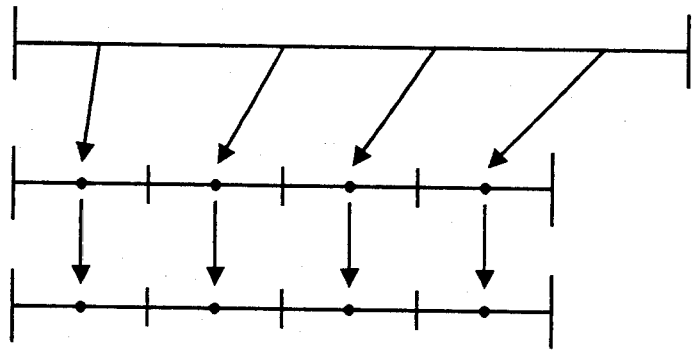
FIG. 3A
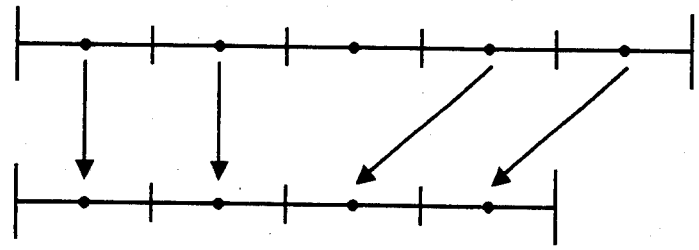
FIG. 3B

HALFTONE IMAGE SCALING

An improved method for changing the size of a halftoned image in a duplicating system without changing the screen pitch by dropping or adding either bits or dots, depending on whether the area of the image to be reduced or enlarged is on an image edge.

BACKGROUND OF THE INVENTION

One important feature on most electronic copiers and duplicators is the decrease or increase of the size of the copy of an original by a non-integer factor. If the original image is available, there are numerous ways to accomplish this. However, frequently, the image has been scanned at a previous time, and the image is stored in memory. The image can be digitally stored as gray scale, typically six or eight bits per pixel, but this requires a large memory. The more common alternative is to halftone the image, resulting in a storage requirement of one bit per pixel. Later, the operator may want to enlarge or reduce the image size, preferably without changing the halftone pitch, which is optimized to the characteristics of the printer. The two most common methods are to delete or add either bits or dots according to the "nearest neighbor" algorithm. Each has its disadvantages.

The deletion of bits, or pixels, from the image results in Moire patterns. These are particularly noticeable, and undesirable, in the broad areas of solid color in the image where there is otherwise little change of image density. In addition, the screen pitch is changed by the amount of the factor. On the other hand, the dropping or adding of entire halftone dots maintains the halftone pitch but results in an unacceptable jaggedness of the image edges. What is required is an image enlargement or reduction process that maintains the same pitch, creates smooth edges and does not create Moire patterns.

SUMMARY OF THE INVENTION

The invention is a method of reducing or increasing the image size of a halftone original by determining whether each particular point is at an edge, and by dropping or adding bits if the point is at an edge, or by dropping or adding halftone dots if the point is not at an edge. In this way, Moire patterns in the solid areas and jaggedness at the edges are both avoided. Also, the halftone pitch is maintained in the solid areas where it is needed. The pitch becomes erratic at the edges, but this is true at a sharp edge in a halftoned image in any case.

BRIEF DESCRIPTION OF THE DRAWINGS

FIG. 1 is a typical halftone matrix pattern.
FIGS. 3A and 3B show how data is transferred between buffers.

DETAILED DESCRIPTION OF THE INVENTION

Figure 2:
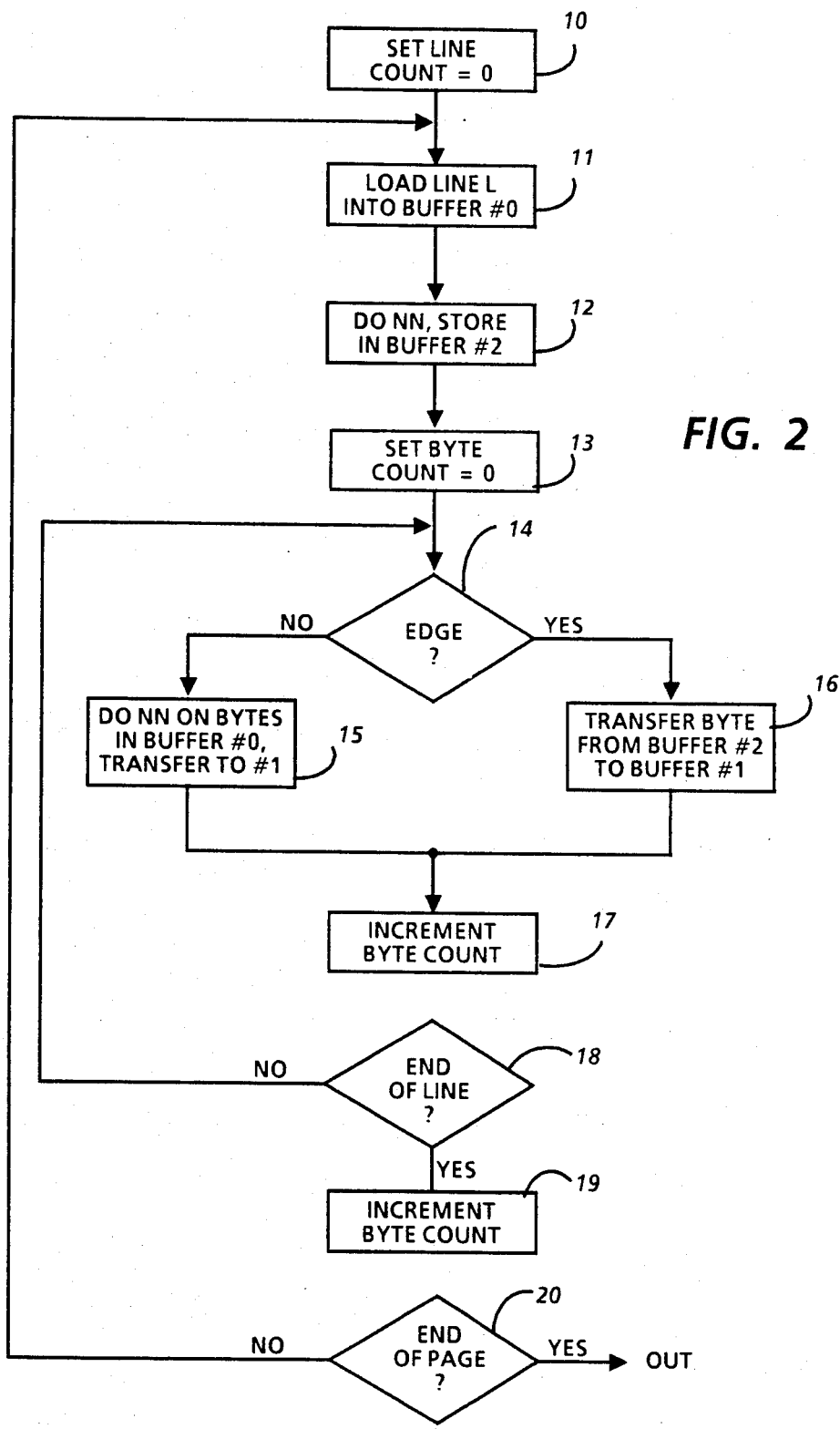
FIG. 2 is a flow chart of the program.

This method is based on the "nearest neighbor algorithm". A short description here will suffice.

Assume an original with pixels spaced one unit apart. Then the pixels will be numbered, $p_0$, $p_1$, $p_2$, etc. Further assume that there will be a reduction of image size in the copy. Then each position in the reduced image will be filled by the pixel nearest to the desired position in the original. For a reduction in image size in a ratio of 1.3 to 1, there must be a reduction in the number of pixels in the copy, resulting in a new set of image pixels, $c_0$, $c_1$, $c_2$, etc. Therefore, the first pixel in the copy must be the one closest to position 0 in the original ($p_0$), the second must be closest to position 1.3 ($p_1$), and the third must be the one closest to position 2.6 ($p_3$). etc. Thus, in this numerical example, original pixel $p_2$ has been deleted. Then, when the resultant reduced set of pixels is printed as a raster line, the image will be reduced in size in the horizontal direction. However, the resultant image will have Moire patterns.

To avoid this patterning of the image, entire halftone pitches should be dropped.

An arbitrary halftone pitch, a variety of which are well known in the art, is shown in FIG. 1. For printers such as xerographic printers, that can print black and white well, but cannot print shades of gray, a half tone pattern is used. Here the printer is allowed to print black dots in a white background. If the size of the dots is small enough, the result will appear gray to the observer. The larger the black dots within the matrix, the darker the gray will appear. Thus, in this invention, it is the entire matrix, which comprises two white and two black dots, which is deleted or added to effect the image reduction or magnification. Of course, this matrix is relatively large, so that a clearly visible jaggedness at image edges is seen when dots are added or deleted using this method. On the other hand, in uniform areas, this deletion cannot be seen.

The optimum solution is to add or delete dots in the uniform areas and pixels at the edges. To do this, an edge detection algorithm is required. There are many ways to detect an edge. The one shown here compares successive sets of bits on a line. An edge is defined as an area of the image where the difference between bit patterns in successive bytes exceeds some predetermined number of bits. The flow chart of FIG. 2 explains this process.

The first step, labelled step 10, is to initialize the line count to zero. Then in step 11 the first line of image data is loaded into buffer 0. In step 12, the nearest neighbor algorithm is performed on the buffer contents, bit by bit, to reduce or magnify the image by the predetermined factor. The result is stored in buffer 2, packed into bytes.

In step 13 the byte counter is set to zero. Step 14 tests the current byte against the previous byte. If there are three or more instances of a particular current bit not matching the same bit in the previous byte, then the program assumes that it is at an edge, and in step 16, transfers a byte from buffer 2 into the matching byte of buffer 1. This is a byte that was reduced or magnified on a bit-by-bit basis. If, on the other hand, an edge was not detected in step 14, the program goes to step 15, where the nearest neighbor algorithm is performed on the bytes contained in buffer 0, the selected byte then being loaded into buffer 1. In either case, the program continues at step 17 where the byte count is imcremented.

Step 18 tests for the end of the line. If not, the program is reentered at step 14 for the next byte. If the end of the line has been reached, the line counter is incremented, and the program tests for the end of the page. If not, the program is re-entered at step 11 for the next line. If the end of the page has been reached, the process is finished.

This process is shown graphically in FIGS. 3A and 3B. FIG. 3A shows 5 bytes of original data in buffer 0. After the nearest neighbor algorithm has been applied on a bit basis, the reduced image occupies four bytes of buffer 2. Since an edge is assumed, the bytes of buffer 2 are transferred to the corresponding bytes of buffer 1. The size of these buffers will vary with the system in which they are used. In a system which prints 240 bits per inch, a 2640 bit buffer will be needed for buffer 0. Since the data may be expanded, buffers 1 and 2 will be larger. Also, the assumption is made that a halftone pitch and a byte both have eight bits, so that the deletion of a byte is the deletion of a halftone pitch which normally contains two black and two white dots.

FIG. 3B shows the nearest neighbor algorithm being applied to the bytes of buffer 0, the selected bytes being loaded into buffer 1. In operation, the program first fills buffer 2, then tests for an edge, and then invokes either alternative, as explained above, on a byte-by-byte basis. In the alternative, the nearest neighbor algorithm could be run on the bits and bytes in parallel, or the edge test could be performed first, and then the appropriate algorithm run. These alternatives would be obvious engineering choices once the basic invention is understood.

The full Fortran program of this invention is reproduced below:

| MAKE MINI (TEKTRONIX PLOT DISPLAY PROGRAM..) | | |
|---|---|---|
| 1. | | * |
| 2. | | * |
| 3. | | IMPLICIT INTEGER (A-W) |
| 4. | | DIMENSION LINE1(0:2047)LINE2(0:2047)INPUT(80) |
| 5. | | DIMENSION LINES(0:5280,0:1) |
| 6. | | CALL FSETSP (0) |
| 7. | | OUTPUT(102)'NEW HT MINIFICATION V=09.1 |
| 8. | | GLOBAL |
| 9. | | * RESOLUTION,INTNATL,LENGTHX, LENGTHY,KEYS,KEYI |
| 10. | | * ,INNAME(3),OUTNAME(3) |
| 11. | | DATA NUM/11/DEMO/17/ |
| 12. | | DATA LINE1,LINE2,FIRST/0/ |
| 13. | C | READ DATA FILE NAME AND OPEN IT. |
| 14. | | OUTPUT(102)'DATA CONTROL FILEO' |
| 15. | | READ(101,10)INPUT |
| 16. | 10 | FORMAT(80R1) |
| 17. | C | LOOK FOR'ME' TO READ F:102.. |
| 18. | | INP=1 |
| 19. | | IF(INPUT(1).EQ.1RM .AND. INPUT(2).EQ.1RE) INP=102 |
| 20. | C | SET UP UNIVERSAL EOF PROCESSING. |
| 21. | | CALL EOFSET(200S) |
| 22. | C | OPEN NAMED FILE FOR INPUT. |
| 23. | | IF(INP.NE.102)CALL OPENX(INP,1,INPUT) |
| 24. | | CALL SOPN((IN=1),INP) |
| 25. | | CALL SOPN((OUT=2),INP) |
| 26. | C | SETUP BREAK CONTROL.. |
| 27. | | CALL SETBR(999$S) |
| 28. | | CALL HALFTONE |
| 29. | | GO TO 220 |
| 30. | 200 | OUTPUT 'E9F' |
| 31. | 220 | CALL FCLOSE(501$S,ERCD,INNAME) |
| 32. | | CALL FCLOSE(501$S,ERCD,OUTNAME) |
| 33. | | WRITE(102,201)RECIN |
| 34. | 201 | FORMAT('AT RECORD',I) |
| 35. | | CALL CLOSES(1,2) |
| 36. | | CALL CLOSES(2,2) |
| 37. | | STOP |
| 38. | C | BREAK.. |
| 39. | 999$ | CONTINUE |
| 40. | | GO TO 220 |
| 41. | 500$ | CONTINUE |
| 42. | | WHO=4HOPEN |
| 43. | | GO TO 510 |
| 44. | 501$ | CONTINUE |
| 45. | | WHO=4HCLOS |
| 46. | | WRITE(102,511)WHO,ERCD |
| 47. | | CALL CLOSES(1,2) |
| 48. | | CALL CLOSES(2,2) |
| 49. | | STOP |

| MAKE MINI (TEKTRONIX PLOT DISPLAY PROGRAM..) -continued | | |
|---|---|---|
| 50. | 508$ | CONTINUE |
| 51. | | WHO=4HREAD |
| 52. | | GO TO 510 |
| 53. | 509$ | CONTINUE |
| 54. | | WHO=4HWRIT |
| 55. | 510 | CONTINUE |
| 56. | | WRITE(102,511)WHO,ERCD |
| 57. | 511 | FORMAT('F',A4,'ERROR,CODE = ',Z2) |
| 58. | | GO TO 220 |
| 59. | C | |
| 81. | | SUBROUTINE HALFTONE |
| 82. | | DIMENSION TABLE(0:255) |
| 83. | | DATA TABLE/0,1,1,2,1,2,2,3,1,2,1,2,1,2,2,3,1,2,2 3,2,3,3,4,1,2,2,3,2,3,3,4, |
| 84. | | *2,3,3,4,3,4,4,5,1,2,2,3,2,3,3,4,2,3,3,4,3,4,4,5, |
| 85. | | *2,3,3,4,3,4,4,5,3,4,4,5,4,5,5,6,1,2,2,3,2,3,3,4,2,3,3,4,3, |
| 86. | | *4,4,5,2,3,3,4,3,4,4,5,3,4,4,5,4,5,5,6,2,3,3,4,5,4,4,5,3,4, |
| 87. | | *4,5,4,5,5,6,3,4,4,5,4,5,5,6,4,5,5,6,5,6,6,7, |
| 88. | | *1,2,2,3,2,3,3,4,2,3,3,4,3,4,4,5,2,3,3,4,3,4,4,5, |
| 89. | | *3,4,4,5,4,5,5,6,2,3,3,4,3,4,4,5,3,4, |
| 90. | | *4,5,4,5,5,6,3,4,4,5,4,5,5,6,4,5,5,6,5,6,6,7, |
| 91. | | *2,3,3,4,3,4,4,5,3,4,4,5,4,5,5,6,3,4,4,5,4,5,5, |
| 92. | | *6,4,5,5,6,5,6,6,7,3,4,4,5,4,5,5,6,4,5, |
| 93. | | *5,6,5,6,6,7,4,5,5,6,5,6,6,7,5,6,6,7, |
| 94. | | *6,7,7,8/ |
| 95. | | COUNT=0 |
| 96. | | DO 30 BLOCK=0 LENGTHY=1,1 |
| 97. | | HTLN=MOD(BLOCK/8,DEMO) |
| 98. | | LNCYCLE=MOD(HTLN,3) |
| 99. | | IF(LNCYCLE.EQ.1)GOTO 30 |
| 100. | | KEY=BLOCK*KEYI+KEYS |
| 101. | C | READ ORIG. DATA. |
| 102. | | CALL FREAD(160S,ERCD,KEY,LINE1, (LENGHT=6000),INNAME) |
| 103. | 130 | CONTINUE |
| 104. | C | INITIATE LINE BUFFER LINES(I,0). Expansion |
| 105. | | LAST=8*LENGTH−1 |
| 106. | | DO 41 I=0,LAST,8 |
| 107. | | LINES(I,0)=LINES(I+1,0)=LINES(I+2,0)= LINES(I+3,0)= |
| 108. | | *LINES(I+4,0)=LINES(I+5,0)=LINES(I+6,0)= LINES(I+7,0)=0 |
| 109. | 41 | CONTINUE |
| 110. | | REPEAT 10, FOR L=(0,LAST) |
| 111. | C | IF WE GO TO 10, IT WILL ADD ONE TO L SO ONLY ADD 31 TO SKIP 32. |
| 112. | | IF(IAND(L,31).EQ.0)IF(LINE1(L/32).EQ.0) L=L+31,GOTO 10 |
| 113. | | LINES(L.0)=ITEST(LINE1,L) |
| 114. | 10 | CONTINUE |
| 115. | C | USING THE NEAREST NEIGHBOR ALGORITHM ON PIXELS. THIS REDUCTION WOULD CAUSE MOIRE. HOWEVER, WE ONLY USE THE EDGES. |
| 116. | | N=0 |
| 117. | | DO 48 L=0,LAST,1 |
| 118. | | HTBN=MOD(L,DEMO) |
| 119. | | IF(MOD(HTBN,3).EQ.1)GOTO 48 |
| 120. | | LINES(N,0)=LINES(L,0) |
| 121. | | N=N+1 |
| 122. | 48 | CONTINUE |
| 123. | | NW=(N+31)/32 Compression |
| 124. | | DO 59 L=0,NW,1 Pack into words |
| 125. | | WORD=LINES(L*32,0) |
| 126. | | DO 58 J=1,31 |
| 127. | 58 | WORD=IOR(ISC(WORD,1),LINES(L*32+J,0)) |
| 128. | 59 | LINE2(L)=WORD |
| 129. | C | USING THE NEAREST NEIGHBOR ALGORITHM ON HT CELLS. |
| 130. | | N=0 |
| 131. | | TFL=LB(JUNK,LINE1,0) |
| 132. | | DO 60 RR=0,LENGTH−1,1 |
| 133. | | HTBN=MOD(RR,DEMO) |
| 134. | | BYT=LB(JUNK,LINE1,RR) |
| 135. | | IFMOD(HTBN,3).EQ.1)GOTO 61 |
| 136. | | CALL STB(BYT,LINE1,N) |
| 137. | | N=N+1 |
| 138. | 61 | REP=RR*NUM/DEMO |
| 139. | | IF(TABLE(IEOR(TFL,BYT)).GE.3) |
| 140. | | *CALL LB(PBYT,LINE2,REP):CALL STB(PBYT,LINE1,REP) |

-continued

| | | MAKE MINI (TEKTRONIX PLOT DISPLAY PROGRAM..) |
|---|---|---|
| 141. | | TFL=BYT |
| 142. | 60 | CONTINUE |
| 143. | C | ZERO END OF LINE1 BUFFER |
| 144. | | DO 49 RZ=NW,LENGTH/4,1 |
| 145. | 49 | LINE1(RZ)=0 |
| 146. | C | WRITE SCALED HALF TONE DATA |
| 147. | | KEY=COUNT*KEYI+KEYS |
| 148. | | COUNT=COUNT+1 |
| 149. | | CALL FWRITE (509$S,ERCD,KEY,LINE1 LENGTH,1,OUTNAME) |
| 150. | 30 | CONTINUE |
| 151. | C | FILL OUT REST OF DOCUMENT WITH WHITE |
| 152. | | DO 150 K=COUNT, LENGTHY−1,1 |
| 153. | | KEY=K*KEYI+KEYS |
| 154. | 150 | CALL FWRITE(509$S,ERCD,KEY,LINE2, LENGTH,1,OUTNAME) |
| 155. | | RETURN |
| 156. | 160 | CONTINUE |
| 157. | | IF(ERCD.NE.7)GO TO 508$ |
| 158. | | CALL GETARS |
| 159. | | GO TO 130 |
| 160. | | END |

This discussion assumed the presence or absence of a detectable edge not in parallel with the direction of the raster, and a compression or expansion in that same direction. Of course, the image will have to be modified in the other direction as well, to maintain the original shape ratios. One way is to rotate the image by ninety degrees using any well known method, and then run this program again in the new direction. A simpler method would be to use the nearest neighbor algorithm to occasionally add or delete sets of eight lines. This method would not require an image rotation, but would result in jagged edges in one dimension.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

What is claimed is:

1. A method of reducing or enlarging a one bit per pixel halftone representation of an image on a line by line basis comprising the steps of:
   determining whether the current halftone segment is on an image edge,
   if the current segment is on an edge, using for the current segment of the reduced or enlarged image a corresponding segment produced by applying the nearest neighbor algorithm to the original image on a bit by bit basis, or
   if the current segment is not on an edge, using for the current segment of the reduced or enlarged image a corresponding segment produced by applying the nearest neighbor algorithm to the original image on a segment by segment basis, thereby preventing Moire patterns in the solid state areas, jaggedness at the edges, and a change of pitch, and
   repeating this process for the remaining lines of the image.

2. The method of claim 1 wherein the same method is used in the horizontal and vertical directions.

3. The method of claim 1 wherein the original two dimensional halftone segment contains two white and two black dots, and is eight by eight bits.

4. The method of claim 1 wherein the determining step comprises the steps of comparing each bit of the current segment against the corresponding bit of the previous segment, and calculating whether the numerical difference is above a predetermined threshold.

5. The method of claim 4 wherein the same method is used in the horizontal and vertical directions.

6. The method of claim 4 wherein the original two dimensional halftone segment contains two white and two black dots, and is eight by eight bits.

7. A method of reducing or enlarging a one bit per pixel halftone representation of an image on a line by line basis comprising the steps of:
   first applying the nearest neighbor algorithm to the original data on a bit by bit basis to produce a first line of generated data,
   dividing said first line of generated data into segments,
   determining whether the current halftone segment is on an image edge,
   if the current segment is on an edge, using the corresponding segment of the generated data for the current segment of the reduced or enlarged image, or
   if the current segment is not on an edge, selecting a segment from the original data using the nearest neighbor algorithm on a segment by segment basis for the current segment of the reduced or enlarged image, and
   repeating the above steps for the remaining lines of the image.

8. The method of claim 7 wherein the determining step comprises the steps of comparing each bit of the current segment against the corresponding bit of the previous segment, and calculating whether the numerical difference is above a predetermined threshold.

9. A method of reducing or enlarging a one bit per pixel halftone representation of one line of an image comprising the steps of:
   constructing a first line of data by applying the nearest neighbor algorithm to the image on a halftone pitch basis,
   constructing a second line of data by applying the nearest neighbor algorithm to the image on a bit basis,
   determining whether the current halftone pitch is on an edge, and
   selecting for the current pitch of the reduced or enlarged image the corresponding pitch from the first line of data if the current pitch is not on an edge, or selecting for the current pitch of the reduced or enlarged image a pitch from the second line of data if the current pitch is on an edge.

10. The method of claim 9 wherein the same method is used in the horizontal and vertical directions.

11. The method of claim 9 wherein the original two dimensional halftone pitch contains two white and two black dots, and is eight by eight bits.

12. The method of claim 11 wherein the determining step comprises the steps of comparing each bit of the current byte against the corresponding bit of the previous byte, and calculating whether the numerical difference is above a predetermined threshold.

* * * * *